No. 735,586. PATENTED AUG. 4, 1903.
Z. RABIE.
SAW.
APPLICATION FILED OCT. 6, 1902.
NO MODEL.
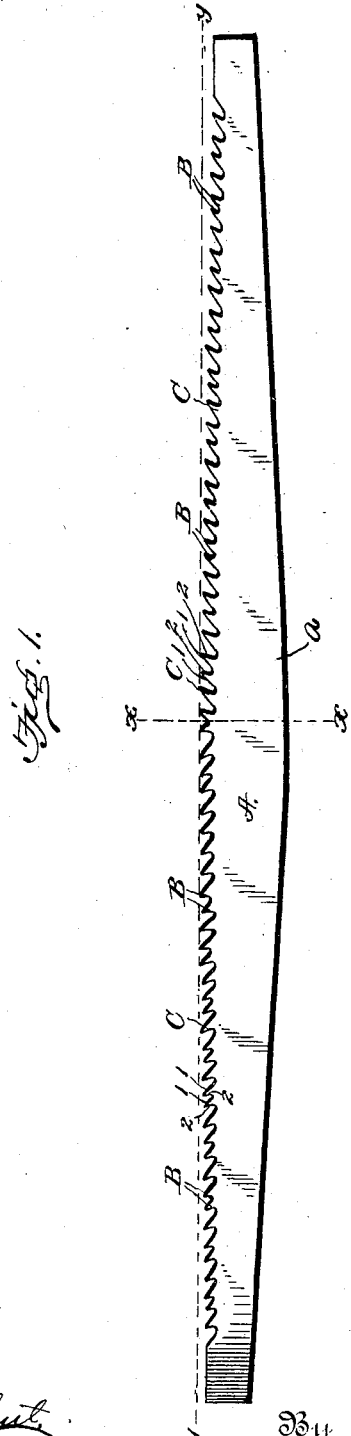
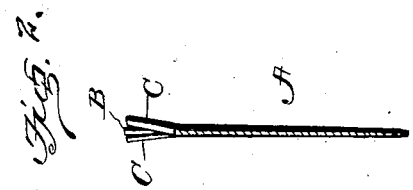
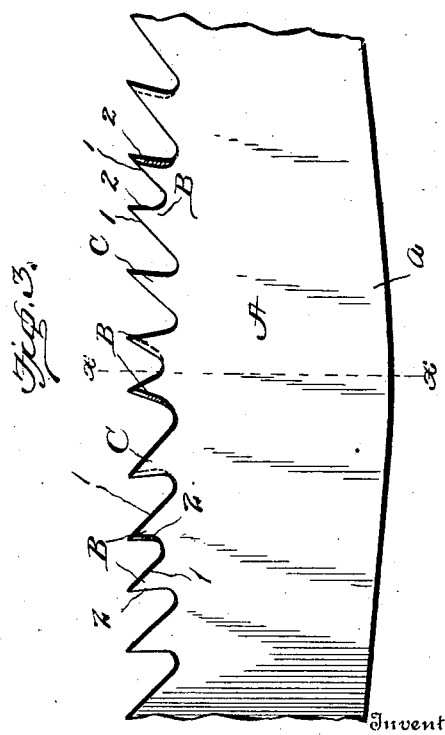
Inventor
Zéphire Rabie No. 735,586. Patented August 4, 1903.

UNITED STATES PATENT OFFICE.

ZÉPHIRE RABIE, OF TWO HARBORS, MINNESOTA.

SAW.

SPECIFICATION forming part of Letters Patent No. 735,586, dated August 4, 1903.

Application filed October 6, 1902. Serial No. 126,198. (No model.)

*To all whom it may concern:*

Be it known that I, ZÉPHIRE RABIE, a citizen of the United States, residing at Two Harbors, in the county of Lake and State of Minnesota, have invented certain new and useful Improvements in Saws; and I do declare the following to be a full, clear, and exact description of the invention, such as will enable others skilled in the art to which it appertains to make and use the same.

My invention relates to improvements in saws; and its object is to provide a device of this character which is simple in construction, comparatively inexpensive of production, durable in use, and very efficient in operation.

With these objects in view the invention consists in certain features of construction and combination of parts, which will be hereinafter fully set forth.

Figure 1 is a side elevation of a reciprocating crosscut-saw with its teeth arranged according to my invention. Fig. 2 is a cross-section through the same. Fig. 3 is an enlarged side elevation of the central portion of the saw, showing more clearly the shape of the teeth.

In the drawings, A denotes the saw-plate with a curved working edge, B the cutting-teeth arranged in pairs, and C the drag-teeth between them. The cutting-teeth B upon each side of the center line $x\,x$ have their respective cutting edges reversely disposed and inclined outwardly toward the respective ends of the saw and obliquely to the axis of the saw to form planes inclined at such an angle as to direct the sawdust upwardly thereon from their points toward their bases to keep their points clear. The drag-teeth C are also inclined or pitched away from the center line $x\,x$ and are swaged to enable them to draw the sawdust from the kerf or cut. As will be noted by the dotted line $y\,y$, the cutting edge of the saw is slightly curved or inclined away from the center line $x\,x$. In practice I prefer to make the saws four feet or more in length and have the top or back $a$ very thin. As shown in Fig. 2, the plate A is tapered from the teeth to the top or back edge $a$. By this construction it will be seen that the saw will not bind in the kerf when in use.

From the foregoing description, taken in connection with the accompanying drawings, it is thought that the construction, mode of operation, and advantage of my improved saw will be readily apparent without requiring a more extended explanation.

Various changes in the form, proportion, and the minor details of construction may be resorted to without departing from the principle or sacrificing any of the advantages of this invention.

Having thus described the invention, what I claim is—

1. A saw provided with cutting-teeth which have their respective cutting edges reversely disposed on opposite sides of the center of the saw and inclined outwardly toward the respective ends of the saw and obliquely to the axis thereof to form planes inclined at such an angle as to direct the sawdust upwardly thereon from their points toward their bases, to keep their points clear, substantially as described.

2. A saw having its cutting edge provided with triangular cutting-teeth and drag-teeth, the cutting-teeth having their cutting edges reversely disposed on opposite sides of the center of the saw and inclined outwardly toward the respective ends of the saw and obliquely to the axis thereof, to form planes inclined at such an angle as to direct the sawdust upwardly thereon from their points toward their bases, to keep their points clear, and the drag-teeth being disposed each in alternation with a plurality of cutting-teeth, substantially as described.

In testimony whereof I have hereunto set my hand in presence of two subscribing witnesses.

ZÉPHIRE RABIE.

Witnesses:
J. E. THERRIEN,
J. B. BOYER.